Patented Aug. 14, 1951

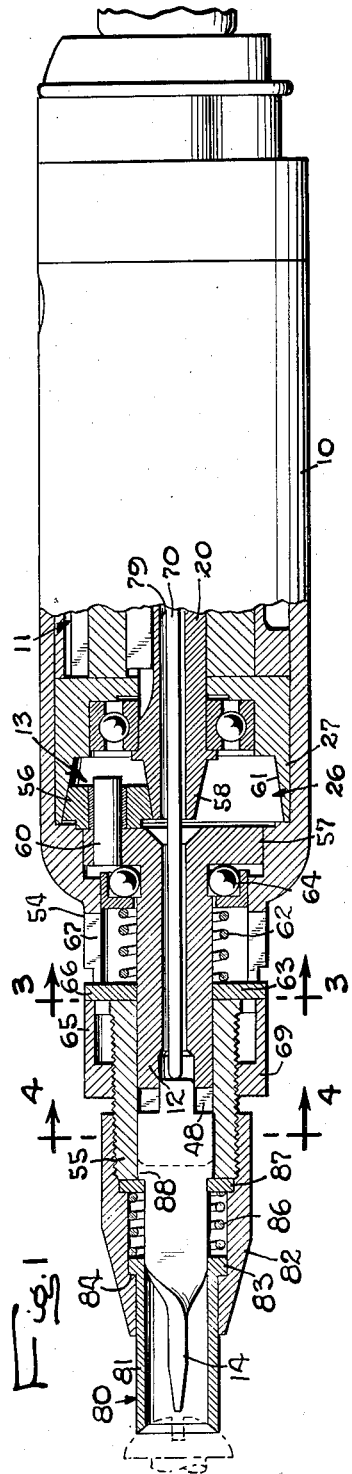

2,564,345

UNITED STATES PATENT OFFICE 2,564,345

CLUTCH DRIVE MECHANISM FOR POWER-OPERATED SCREW DRIVERS AND THE LIKE

Ernest H. Shaff, Spring Lake, Mich., assignor to Keller Tool Company, Grand Haven, Mich., a corporation of Michigan Original application January 2, 1947, Serial No. 719,803. Divided and this application June 2, 1948, Serial No. 30,696

1 Claim. (Cl. 74—798)

The invention relates to portable power driven tools such as screw drivers and nut runners, and it has for its primary object the provision in such a tool of a combined speed reduction and friction slip clutch drive between the motor and the tool spindle with means of simple and advantageous construction for adjusting the pressure between the driving and driven members of the clutch.

Other objects and advantages of the invention will become aparent from the following detailed description taken in connection with the accompanying drawings, in which:

Figure 1 is a longitudinal sectional view through a tool having an adjustable drive clutch embodying my invention, the rear end portion of the tool being shown in elevation.

Fig. 2 is a fragmentary plan view partially in section of the clutch adjusting means.

Figs. 3 and 4 are respectively transverse sectional views taken approximately in the lines 3—3 and 4—4 of Fig. 1.

As illustrated in the drawings, the exemplary form of the invention is shown embodied in a portable pneumatic screw driver comprising a generally clindrical main casing 10 having a rotary pneumatic motor 11 for driving a spindle 12 through the medium of a drive mechanism including a friction slip clutch 13. In the embodiment shown the front end of the spindle 12 is constructed for driving engagement with a screw driving bit 14.

The tool spindle 12 is journalled in a spindle housing 54 of smaller diameter than and projecting from the main casing 10. Herein the spindle is in the form of a hollow shaft in axial alinement with the tubular drive shaft 20 and having its outer end shaped to form jaws 48 to loosely hold the bit 14 while permitting the passage of air about the latter member for a purpose which will presently appear. The forward end of the spindle is journalled in a sleeve 55 rigid with the spindle housing and forming a forward extension thereof.

The driving connection between the motor 11 and the spindle 12 is of a character such as to permit slippage between the driving and driven members when a predetermined load is applied to the spindle. In the present instance I have shown, for purposes of illustration, a driving connection in the form of a combined clutch and speed reducing mechanism disposed in the chamber 26 between the driving shaft 20 and the spindle 12. This mechanism comprises cone-shaped members or rollers 56 mounted in planetary relation on a spider 57 rigid with the spindle 12 and coacting with a cone-shaped drive member 58 rigid with the drive shaft 20. The rollers are journalled on pins 60 projecting axially toward the motor from the spider 57. As the rollers are caused to rotate about their respective axes by contact with the drive cone they are simultaneously caused to roll on an internal inclined surface 61 on the sleeve 27, the latter member being concentric with the drive cone.

An important feature of my invention resides in the provision of means conveniently accessible from the exterior of the tool for varying the frictional pressure between the drive member and the driven member of the drive mechanism. In this instance, a compression spring 62 encircling the spindle 12 is interposed between an adjustable abutment or collar 63 encircling the spindle, and a fixed abutment such as a ball thrust bearing 64. The force exerted by the spring is transmitted to the spider 57 through the thrust bearing 64, thereby urging the rollers 56 into frictional engagement with the tapered surfaces of the drive cone 58 and the stationary sleeve 27.

To adjust the frictional pressure between the surfaces of the frictionally engaged members of the clutch mechanism, the tension of the spring urging the clutch members into engagement may be changed by varying the axial position of the collar 63. For this purpose, I provide means including a sleeve or ring 65 conveniently accessible from the exterior of the tool. The ring encircles the outer end of the spindle housing and one end thereof abuts radial lugs 66 rigid with the collar 63 and projecting through longitudinally extending slots 67 in the spindle housing 54. At its other end the ring is constructed to form a nut 69 screw threaded upon the sleeve 55. It will be seen that by turning the ring the position of the collar 63 may be varied thereby changing the tension of the spring.

As herein shown, the forward end of the tool is constructed to provide a suction-operated finder 80 for receiving and holding a screw or other threaded element. Herein the finder is in the form of a tube 81 encircling the bit 14 and communicating by way of a passageway 79 with a suitable suction producing means (not shown) forming no part of the present invention. Extending through the passage 79 is a rod 70 for the actuation of a valve (not shown) controlling the operation of the motor 11.

The tube 81 is slidably mounted in a tapered nosepiece 82 threaded on the sleeve 55, and one end of the tube has an annular flange 83 which abuts a shoulder 84 on the interior of the nosepiece to prevent withdrawal therefrom. (The other end of the tube is formed to receive roundheaded screws more readily.) Normally, the outer end of the tube is forced to protrude beyond the end of the nosepiece by a compression spring 86. The latter encircles the bit and is interposed between the flange 83 and an abutment in the form of a collar 87 encircling the bit, urging the flange into engagement with the shoulder 84. The collar 87 additionally serves to prevent withdrawal of the bit from the tool. Thus it provides a stop for engagement by a shoulder 88 on the shank of the bit 14.

In the operation of the tool the finder is inserted into a container having a supply of screws and upon contact with the head end of the screw the suction at the finder end of the tool picks up and holds the screw in the proper position (Fig. 1). With the screw thus held applied to the work endwise pressure is applied to the tool, causing the finder to telescope into the nosepiece 82, thereby bringing the bit into engagement with the head of the screw as shown in Fig. 2. Additionally, pressure on the finder urges the rod 79 axially rearward to start the motor.

When the driving torque on the screw has exceeded a predetermined maximum, the clutch drive 13 will slip so that the tool spindle will come to rest. The amount of torque to be applied to the screw can be quickly and easily changed by turning the adjusting ring 65, which is readily accessible from the exterior of the tool, thereby varying the tension on the spring 62.

This application is a division of my application Serial No. 719,803, filed January 2, 1947.

I claim as my invention:

In a power operated tool the combination of a housing, a motor having a drive shaft disposed within said housing, a spindle coaxially disposed with respect to said shaft and supported for limited axial movement, and a drive mechanism interposed between said shaft and spindle for drivingly connecting the same, said drive mechanism including a driving element rigid with said shaft and having an outer conical surface thereon, a stationary ring element having a conical inner surface coaxially disposed with respect to said driving element, said inner surface having an equal and opposite slope with respect to the outer surface of the driving element, planet elements disposed between said sun and ring elements and presenting conical outer surfaces complementary to said surfaces of the driving and ring elements for engagement therewith, a carrier rigid with said spindle and rotatably supporting said planet elements, an abutment mounted on said housing, a compression spring interposed between said carrier and abutment and operative to urge said planet elements into engagement with said driving and ring elements, and means for adjusting the position of said abutment to vary the degree of compression of said spring whereby the pressure between the engaged surfaces of the driving ring and planet elements is altered.

ERNEST H. SHAFF.

REFERENCES CITED

The following references are of record in the file of this patent:

UNITED STATES PATENTS

| Number | Name | Date |
|---|---|---|
| 622,207 | Collins | Apr. 4, 1899 |
| 726,461 | Rennerfelt | Apr. 28, 1903 |
| 1,425,172 | Cameron-Cowburn | Aug. 8, 1922 |
| 1,545,243 | Fletcher | July 7, 1925 |
| 1,642,346 | Uytjens | Sept. 13, 1927 |
| 1,662,681 | Lindner | Mar. 13, 1928 |
| 2,176,928 | Short | Oct. 24, 1939 |
| 2,198,921 | Shaff | Apr. 30, 1940 |
| 2,306,475 | Wahl | Dec. 29, 1942 |
| 2,315,486 | Mulder | Apr. 6, 1943 |

FOREIGN PATENTS

| Number | Country | Date |
|---|---|---|
| 530,443 | Germany | July 29, 1931 |